United States Patent [19]

Sinclair

[11] Patent Number: 4,910,048
[45] Date of Patent: Mar. 20, 1990

[54] REMOISTENABLE ADHESIVES

[76] Inventor: Peter Sinclair, "Glenside", London Road East, Amersham, Buckinghamshire HP7 9DH, England

[21] Appl. No.: 350,519

[22] Filed: May 11, 1989

Related U.S. Application Data

[60] Division of Ser. No. 201,393, May 25, 1988, Pat. No. 4,833,002, which is a continuation of Ser. No. 914,497, Oct. 2, 1986, abandoned.

[30] Foreign Application Priority Data

Oct. 4, 1985 [GB] United Kingdom ............... 8524584

[51] Int. Cl.$^4$ ............................................. B05D 5/10
[52] U.S. Cl. .............................. 427/208.6; 427/207.1
[58] Field of Search .................... 427/207.1, 272, 208.6

[56] References Cited

U.S. PATENT DOCUMENTS

| | | |
|---|---|---|
| 1,297,406 | 3/1919 | Schoder . |
| 1,619,027 | 3/1927 | McLaurin . |
| 2,264,628 | 12/1941 | Engert et al. . |
| 3,033,702 | 5/1962 | Fenselau . |
| 3,271,228 | 9/1966 | Ives .................................... 428/343 |
| 3,988,495 | 10/1976 | Lowey et al. ...................... 428/383 |
| 4,460,634 | 7/1984 | Hasegawa .......................... 428/112 |

FOREIGN PATENT DOCUMENTS

| | | |
|---|---|---|
| 0041842 | 12/1981 | European Pat. Off. . |
| WO85/04602 | 10/1985 | European Pat. Off. . |
| 923404 | 7/1947 | France . |
| 373343 | 5/1932 | United Kingdom . |
| 998692 | 7/1965 | United Kingdom . |
| 1002050 | 8/1965 | United Kingdom . |
| 1006353 | 9/1965 | United Kingdom . |
| 1065449 | 4/1967 | United Kingdom . |
| 1096058 | 12/1967 | United Kingdom . |
| 1137069 | 12/1968 | United Kingdom . |
| 1207387 | 9/1970 | United Kingdom . |
| 1272843 | 5/1972 | United Kingdom . |
| 1420743 | 1/1976 | United Kingdom . |
| 1600954 | 10/1981 | United Kingdom . |

Primary Examiner—James J. Bell
Attorney, Agent, or Firm—Burns, Doane, Swecker & Mathis

[57] ABSTRACT

Paper coated uniformly with discrete dots of remoistenable adhesive, especially based on starch or polyvinyl alcohol, has curl stability comparable with particle gum coated papers. Preferably, the dots are less than 0.3 mm in diameter and typically spaced 0.5 to 1 mm (centers) apart. The product is made by screen coating dots of aqueous adhesive mix onto base paper.

28 Claims, No Drawings

REMOISTENABLE ADHESIVES

This applicatin is a divisional of application Ser. No. 201,393, filed May 25, 1988 now U.S. Pat. No. 4833,002 which in turn is a continuation of application Ser. No. 914,497 filed Oct. 2, 1986 now abandoned.

This invention relates to remoistenable adhesives and to paper webs coated with remoistenable adhesives.

Remoistenable adhesives are a class of adhesives which are normally not tacky and are rendered tacky (activated ) by contact with water. Conventional gummed labels, adhesive postage stamps and some types of gummed paper tape make use of remoistenable adhesives. Typically such remoistenable adhesives are based on gelatinized starch adhesives deposited to form a film of adhesive on a paper web. Continuous films of remoistenable adhesives, especially gelatinized starch are sensitive to changes in humidity that as the humidity increases the starch absorbs water and swells. The paper substrate also absorbs water resulting in dimensional changes but to a different extent than the starch. This causes the adhesive coated paper to curl to an extent dependent on the ambient humidity. For many commerical applications, especially flat labels, this curl instability is undesirable.

Two techniques are in current use to try to obtain remoistenable gummed papers with acceptable curl stability. The first method is to coat the paper with a continuous film of adhesive and subsequently to mechianically break up the film. This latter step is knowm as gum breaking and is carried out by passing the coated paper over the edges of blades with the adhesive layer on the outside. Usually a pair of blades at right angles are used in succession, the paper passing diagonally over each to give a diamond shaped pattern of breaks in the adhesive film, although this improves the humidity stability of the product but does not generally give a flat product. The second method is to deposit the remoistenable adhesive as a layer comprising a matrix of very fine particles on the substrate. This can be done by using a non-aqueous coating fluid in which the adhesive particles are not soluble. To bind the adhesive particles to the substrate the coating includes a binder such as polyvinyl acetate. The overall effect is that of a "honeycomb" of adhesive particles stuck to each other by the binder the layer having a substantial void volume. One such method is described in published European Pat. application No. 0041842. These adhesives are known as particle gums and most commonly use gelatinized starch as the remoistenable adhesive. The second method generally produces better results than gum breaking but is more expensive in materials and equipment.

Remoistenable adhesive coated papers having little or no tendency to curl when the ambient humidity is changed i.e. papers that have good curl stability, are commonly described as being "flat". Among flat papers varying degrees of "flatness" may be recognized. A major reason for requiring good flatness in remoistenable, especially label, paper is that it, especially the non-gummed side, is often printed. A flat paper can be printed fairly readily, in contrast to a paper with poor flatness which is liable to curl substantially and be difficult to feed into a printing press, whether web fed or sheet fed. In extreme cases, as for example with papers having a continuous film of gum, the paper can "tube" i.e. curl to such an extent as to form a tube-like tangle which is effectively unusable as a substrate for printing. Commericially available gum-broken products may not tube but will normally not be flat enough to make printing them a straightforward matter. Solvent coated particle gummed label paper is usually flat enough to print but is relatively expensive to manufacture.

This invention is based on an approach to the problem from a different direction in that it starts with an aqueous coating mix of the remoistenable adhesive and applies it to the paper web to give a coating of discrete dots. Using this technique we have been able to make products which are exceptionally flat, in some cases flatter even than those obtained using particle gums, but without the difficulty and expense of using non-aqueous solvents.

The present invention accordingly provides a paper web coated uniformly over one surface thereof with a discontinuous coating of a remoistenable adhesive in the form of discrete dots of the adhesive deposited directly onto and adherent to the paper.

The invention inlcudes a paper web coated uniformly over one surface thereof with a discontinuous coating of a remoistenable adhesive in the form of screen coated, discrete dots of the adhesive deposited directly onto and adherent to the paper.

It is a particular feature of the invention that the adhesive coating on the paper is in the form of discrete dots. By describing the dots as discrete we mean that each dot adheres to the paper and is separate from and not adhered to adjacent dots. In particular it is desirable in achieving optimum curl stability that, so far as is consistent with the size of dots and the coatweight, which are discussed below, each dot is as far as possible from its neighbours. The practical way we have found to do this is to coat the paper with a substantially regular array of the dots of adhesive. Thus, the use of regular arrays of dots for the coating forms a particular feature of the invention. The precise geometrical arrangement of dots is not of itself critical. However, arrays with high symmetry are advantageous as, for dots of the same size and overall number per unit area, they enable higher minimum distances between nearest neighbours. Square, offset square and, especially, hexagonal arrays are particularly efficient in this regard.

The dots of adhesive are deposited directly onto and are adherent to the base paper. In other words, the adhesive adheres to the base by virtue of its own adhesive properties and not those of a separate binder phase. As is described below, the process of the invention takes advantage of the remoistenable nature of the adhesive i.e. that it is tacky when wet, to coat the adhesive as an aqueous coating mix thus adhering it to the paper. It is a particular advantage of the invention that the areas of base paper surface lying between the dots (after allowing for dot spreading) are effectively undisturbed and we believe that this contributes substantially to the good curl stability tha can be obtained.

The products of the present invention can be made to be flat so that printing them is not restricted by curling. However, if a sheet of paper coated with large dots of remoistenable adhesive were printed on its non-adhesive surface, the pressence of the (large) dots could cause a localized increase in printing pressure over the dots thus leading to a variation in image density. This variation is undesirable and can be avoided by keeping the dots small. It is particular feature of the invention that the average dot diameter is not more than 0.5 mm and the use of dots having diameters not more than 0.3 mm is particularly beneficial. Because, as is noted below, the adhesive coatweight varies directly with the size of the dots, the dot diameter will usually be at least 0.05 mm and more typically at least 0.1 mm. A particularly useful range is 0.1 to 0.25 mm.

In the present context dot "diameter" refers to the diameter of a circle with equal area. It is desirable that the dots are circular or approximately circular but may be triangular, rectangular or higher polygonal e.g. hexagonal, especially with rounded vertices, or ellipitical or annular or other distorted but near circular elliptical or annular or other distorted but near circular shape. To remain near circular the ratio of maximum to minimum section through the centre of the dot will not usually be more than 2 and will normally be less than 1.5. We have obtained satisfactory results with square and circular dots. In practice, in manufacture the surface tension of the coating mix will tend to round off the dots. Clearly the height of the dots would be expected to have a bearing on the printing characteristics. We have found that larger dots can be deposited to be thicker than smaller dots. We have been able to print the uncoated side of coated paper of the invention, especially where the dots have an average diameter of not more than about 0.3 mm, line, full tone, block and half tone images on conventional printing e.g. offset ("wet") lithographic, presses without experiencing any difficulties arising from curl instability or pressure differentials from the discontinuous nature of the coating. Registration did not seem to be a problem and good multicolour images were also printed successfully. The coated side of the paper has also been successfully monochrome and multicolour printed and, because the coating does not have the porous honeycomb-like structure of particle gums, the printing ink films stays on the surface and gives a brigher, sharper and glossier image than is obtained on those particle gum papers which can be printed on their adhesive coated sides. Further, particle gummed papers are known to be liable to dusting, because the adhesive particles are only relatively lightly bound (use of more efficient binding would tend to "blind" the remoistenable adhesive), whereas the dot coated products of this invention seem less prone to dusting than the uncoated base paper. In effect, the dots of adhesive improve the surface binding of the paper, presumably because they are directly deposited on and adhere to the base paper surface. The adhesive coated side of the dot coated product can be printed with line, full tone, block and half tone images. However, as the ink generally forms a film over the surface of the coated paper, dots lying under the ink film are effectively blinded. Thus, printing block full tone images may cause the coated paper to be non-adhesive in those areas. Half tone imaged areas normally remain remoistenable but on remoistening the ink may be smudged.

An overall quantitative limit on the coating is provided by the functional requirement that the amount of adhesive, i.e. the coatweight, is at least sufficient to function effectively as a remoistenable adhesive. The minimum amount of adhesive needed for adequate functionality depends on the particular nature of the adhesive but will usually be at least 2 g m$^{-2}$ and typically at least 4 g m$^{-2}$. For adhesives based on synthetic polymers such as acrylics the coatweight can be in the range 4 to 6 g m$^{-2}$ and for polyvinyl alcohol 5 to 18 especially 8 to 14 g m$^{-2}$. Starch based adhesives will typically require 6 to 20 particularly 10 to 15 g m$^{-2}$. The upper limit on adhesive coatweight is technical in that it will not be so much that the dots of adhesive coalesce to form a continuous film and economic in that generally no more adhesive than is needed to provide the required product performance will be used.

However, we have found that there is a relationship between dot size and coatweight. Thus, changing only the dot size, it seems that with larger dots the dot can be made thicker giving a greater proportionate increase of coatweight than might otherwise be expected. Other factors, inlcuding the properties of the adhesive coating mix used and the operating conditions of the coater used also influence coatweight as also, plainly, does the dot to dot separation. As indicated above it is advantageous to use small dots and to achieve relatively high coatweights it is desirable to use high symmetry regular arrays with (absolutely) small dot to dot separation. Generally we have obtained good results using dot arrays having a ratio of dot diameter to minimum (edge to edge) dot spacing (in square or hexagonal arrays) of at least 1 with typical values being in the range 1.2 to 2.2. At even higher ratios it may be difficult to stop dot coalescence, which will prevent the dots being truly discrete. Using such close spacings the proportion of the surface of the paper under the dots is typically at least 25% and particularly from 30 to 40%. Even with highly symmetrical regular arrays of dots using very much higher area coverage may lead to dot coalescence or filming of the adhesive.

As has been indicated above, a wide variety of remoistenable adhesives can be used in this invention including synthetic adhesives based on acrylic polymers, polyvinyl acetate or polyvinyl alcohol. The invention is particularly applicable to remoistenable adhesives based on starch, modified starch and starch derivatives, and especially dextrins, because flatness, or rather the lack of it, is an especial problem with starch adhesives. The invention is also particularly applicable when the adhesive is based on polyvinly alcohol (PVOH). PVOH based adhesives are relatively more weight efficient i.e. less is generally needed to achieve a particular level of adhesion, than starch based adhesives. As is known the adhesive properties of PVOH remoistenable adhesives vary with varying molecular weight. Low molecular weight materials give good tack, high molecular weight materials give good adhesive strength and medium molecular weight materials give moderate tack and adhesive strength. High molecular weight PVOH's can give very high viscosities in water at relatively low solids and this may limit the amount of such materials used in the practice of this invention. Mixtures of adhesives can be used to obtain desired product properties or process characteristics.

Although we have successfully used adhesive coating mixes consisting solely of the adhesive polymer dissolved in water, it will be usual for the adhesive polymer(s) to be formulated with other components. We expect that materials such as biocides, flavourings and sweeteners will be inlcuded as desired according to the intended end use and that process aids such as defoamers or materials to inhibit stringing (see below) will be used as necessary. Other possible additives include humectants and plasticisers to protect the adhesive from excessive moisture loss during processing or storage. However, quantitatively, the major further components of the adhesive formulation will be clays, the use of which is described in more detail below, and other polymeric constituents. The latter materials are exemplified by polyvinyl acetate (PVA) which can be included in starch/dextrin or PVOH based adhesives. The grades of PVA used in remoistenable adhesives will be those which are compatible with the adhesive polymers used. Grades of PVA are commerically available which are designed to be compatible with dextrin and PVOH remoistenable adhesives. The amount of PVA used in the adhesive formulation will be selected to achieve the desired properties on similar criteria to its use in conventional remoistenable adhesives. Typically, when used, it will comprise at least 10% by and up to as much as 80% but commonly 20 to 60% by weight of the polymeric components of the adhesive. Thus, although PVA is not by itself a remoistenable adhesive it can be the major (by weight) polymeric component of practical remoistenable adhesives. PVA will usually be provided to the coating mix as a latex and this may give an adventitious benefit as the presence of disperse phase particles (the PVA itself) will tend to reduce stringing (see below).

It is particular feature of this invention that the adhesive coating is of discrete dots. In the coating process, the dots of adhesive coating mix will tend to spread between deposition on the paper web substrate and drying. Generally, the higher the viscosity of the coating mix, the less the dots of coating will spread. Higher viscosities can be achieved by using coating mixes using higher viscosity components e.g. higher molecular weight adhesives or adding thickeners, or by using relatively high solids contents in particular greater than 50% e.g. up to 70 or 75%. Such high solids contents also reduce the drying requirement and thus the interval between deposition and drying. Additionally, the coating mix will penetrate the base but, although some base penetration is beneficial in adhering the individual dots to the base, undue base penetration may take the form of sub-surface spread, in extreme cases leading to merging of adjacent dots under the paper surface and giving inferior flatness even though on surface inspection the dots of adhesive on the surface appear separate. As with surface spread, spread by base penetration is reduced by using high viscosity, high solids coating mixes. A further advantage arising from the use of high solids and thus high viscosity coating mixes is that the amount of water applied to the substrate web is small as is the extent to which it wets the web. This reduces the extent to which the web is affected by on-machine curl i.e. curl induced by the coating and drying process itself. This is advantageous in that it reduces the extent of on-machine decurling e.g. by controlled application of water to the non-coated side of the paper, necessary.

The coating of the product of this invention is deposited onto the paper web substrate from an aqueous coating mix to produce discrete dots of coating mix on the web which are then dried. The dots are small and, especially where high solids coating mixes are used, the amount of water applied to the web is correspondingly small. Accordingly, care may be needed to avoid overdrying the adhesive as such overdrying usually may have a deleterious effect on the opearing charcteristics of the adhesive. We have particularly noted this adverse effect in the rate of remoistening and the rate at which the strength of the adhesive bond builds up. This can be exemplified by considering the adhesion of a re-moistened label made from dot adhesive coated paper of this invention to a paper substrate. A significant measure of the adhesion properties is the time taken for the bond strength to exceed the paper strength so that an attempt to strip the labe tears the paper of the label or substrate. Overdrying can substantially lengthen this time.

To our surprise we have obtained particularly good overall results in using adhesive compositions containing substantial amounts of hydrophilic clays e.g. china clay. The inclusion of small amounts e.g. up to 15% on a dry weight basis, of fillers such as clay in adhesives has long been known as economic extenders or rheology or process modifiers. The conventional wisdom is that the use of larger proportions of filler result in a marked deterioration in adhesive performance. We have found nothing to suggest that the conventional view is not correct for conventional products especially where the adhesive is coated on the substrate as a film. However, in the context of this invention, the expected deterioration is absent or at least much less marked than would be expected. In some cases we have observed an improvement in the functioning of the product as a remoistenable adhesive when substantial amounts of clay are included as compared with when no clay is used.

We do not know why the inclusion of substantial amounts of clay does not have the expected deleterious effect, but we think it possible that the the presence of the clay may make the adhesive less susceptible to overdrying or that it facilitates penetration of water into the adhesive during remoistening. We think it likely that the maximum adhesive strength of the adhesive will be less with clay present but, because the strength of the adhesive bond is likely to be greater than that of the paper substrate, this reduction is of little practical importance.

When used, the hydrophilic clay will be included typically as from 30 to 70% and especially 40 to 60%, dry weight basis, of the adhesive composition. Suitable clays include china clay and other forms of kaolin and similar clays such as those sold under the trade name "Dinkie" by English China Clays. The use of clays in this way can contribute to high solids in the coating mix.

Accordingly, the invention includes a paper web, especially stock for printed labels, coated uniformly over one surface thereof with a discontinuous coating of a remoistenable adhesive, including a hydrophilic clay, in the form of discrete dots, in particular screen coated discrete dots, of the adhesive deposited directly onto and adherent to the paper.

We have found that the provision of the adhesive coating comprising discrete dots can be carried out particularly effectively by using a screen printer to coat the dots onto the paper web. In screen printing the shape of the printed area and the amount of ink deposited on the substrate are determined by a compound screen/stencil. The "screen" was originally of woven silk (hence "silk screen printing") but is now more usually a metal wire or synthetic plastic mesh either woven or formed of a perforated sheet.

For the application of coatings in this invention a continuous rotary screen will usually be used. In conventional continuous rotary screen printing, a stencil defines image areas with the rotary screen acting to meter the ink as in flat bed screen printing. In the present invention, the size of the discrete dots making up the coating and their spacing are comparable with typical rotary screen aperture size and spacing. Thus, a stencil will not usually be used to produce the dot coated products of this invention. In practice, we have found it desirable to use screens with smaller and usually more closely spaced apertures than are commonly used for screen printing on such equipment. Flat bed screens e.g. hand screens used for laboratory work, usually have relatively much finer screens than in continuous rotary screen equipment. Thus, if flat bed screens are used to produce the coated product of this invention a stencil e.g. in the form of a resin layer impregnated into the screen, defining the dot coating pattern will usually be used. The use of a screen, particularly a continuous rotary screen, to make the dot coated product of this invention is referred to herein as "screen coating".

The equipment used to carry out continuous rotary screen coating typically comprises a driven cylindrical screen, usually a perforated, thin walled metal cylinder, and a driven backing roll. The web to be coated passes over or round the backing roll and through the "nip" between the screen and backing roll. Although the term 'nip' is used the contact pressure is usually only adequate to maintain suitable contact between web and screen. A flexible squeegee blade, usually with a metal tip, is fitted inside the screen, with the blade tip pressed against the inside surface of the screen adjacent the length of the nip. Coating mix is introduced inside the screen to form a puddle between the squeegee blade and the inside of the screen. Rotation of the screen pushes the coating mix against the squeegee and screen and pushes it through the screen with the squeegee blade acting to meter the amount. The squeegee is adjustable to change the pressure applied to the blade and thus the force at the tip. An increase of pressure increases the amount of mix pushed through the screen and thus the coatweight applied to the web. For constant dot spacing this will also increase dot diameter. Movement of the blade tip in relation to the nip can also affect coatweight. The flexibility and size of the squeegee blade can also be changed but this, as is the choice of screen, is more a matter of setting up than adjustment. We have also found that coatweight and dot size also tend to increase with increasing line speed, presumably because the blade tends to ride on a pool of mix which is pushed through the screen. As is mentioned above it is possible to vary the coatweight applied to the paper web using a particular combination of screen and adhesive coating mix by adjusting the operating conditions. This coatweight variation will usually be reflected in a corresponding change of dot size. Care may be needed when trying to increase the coatweight to avoid undue increase in dot size as might lead to coalescence of the dots.

The technique of rotary screen coating places requirements on the adhesive coating mix to ensure good runnability. These requirements are somewhat analogous to those for screen printing inks. The coating mix will usually have a fairly high viscosity, typically in the range 1500 to 5000 especially 2500 to 4000 cP Brookfield (Spindle No. 7 at 100 rpm) and will be moderately shear thinning. High viscosity at low shear helps to prevent the mix oozing through the screen apertures too far in advance of the squeegee blade. Under the squeegee blade the rate of shear is higher and shear thinning helps to ensure good transmission through the screen apertures under the blade and onto the paper web. After deposition on the web, the shear is again low, and restored high viscosity helps to prevent undue dot spread. If the mix were substantially thixotropic then the viscosity would remain low for a significant time after the shear was reduced and this would tend to promote dot spread and possibly lead to coalescence which is undesirable. The selection or design of suitable adhesive coating mixes is relatively straightforward within these general requirements although some trials may be needed to optimise conditions. The rheology of the adhesive coating mix can be varied by varying the solids content of the mix, higher solids contents generally give higher viscosities; by choice of the molecular weight of the adhesive used, higher molecular weights generally give higher viscosities; by choice of adhesive type or by adding viscosity modifiers e.g. high molecular weight polymers such as alkyl cellulose deriavatives, to increase mix viscosity or low molecular weight polar molecules, such as urea, or lower molecular weigth polymers e.g. is low molecualr weight PVOH, to reduce mix viscosity.

In addition to mix rheology, the behaviour of the adhesive coating mix at the film split on the outgoint side of the nip between paper web and screen is important. As the screen is rotating fairly rapidly and the adhesive mix is relatively viscous there can be a tendency for the mix to form "strings" or to "spin". This is analogous to the behaviour of some screen printing inks. Mixes with this tendency are described as "long" and can be "shortened" by using lower molecular weight constituents or by incorporating phase boundaries into the mix e.g. by including emulsion droplets e.g. polymer latices, solid particles e.g. of clay or chalk, or incompatible compounds or polymers e. g. sodium alginate for dextrins. As might be expected, stringing will usually be worse under higher shear i.e. at higher machine speeds. The rheology and spinning characteristics of the coating mix need be less closely defined if coating is carried out using a flat bed screen coating device although the same general principles apply.

The invention, accordingly, includes as a specific feature a method of making a paper web coated uniformly over one surface thereof with a discontiuous coating of a remoistenable adhesive, which comprises screen coating an aqueous coating mix of the remoistenable adhesive through a screen or screen/stencil combination which provides image areas in the form of discrete dots, whereby the adhesive is coated onto the substrate as discrete dots adhered to the substrate and drying the coated substrate.

As a primary produce for which this invention is especially useful in labels, the invention specifically includes a method of making a printed label carrying a coating of a remoistenable adhesive which method comprises screen coating an aqueous coating mix of the remoistenable adhesive through a screen or screen/stencil combination which provides areas of coating ('image' areas) in the form of discrete dots, whereby the adhesive is coated onto the substrate as discrete dots adhered to the substrate and drying the coated substrate and subsequently printing the substrate to provide the label.

The following Eamples illustrate the inventon. All parts and percentages are by weight unless otherwise indicated. Brookfield viscosities were measured using a No. 7 spindle at 100 revs per minute (1.67 Hz) at or adjusted to 23° C. Ferranti-Shirley viscosities were obtained by using a Ferranti-Shirley viscometer to produce rheograms over a range of speeds. These data were mathematically transformed into plots of viscosity against shear rate and viscosity values for low shear (shear rate $=1000$ sec $^{-1}$) and high shear (shear rate $=5000$ sec $^{-1}$) are quoted to indicate the shear thinning behaviour of the adhesive mixes.

In assessing the flatness of the adhesive coated papers two methods were used as follows:

(a) 10 cm diameter circular samples of the paper are cut and exposed to test humidities of 40, 50 and 60% relative humidity (RH). After conditioning at each test humidity for 1 hour the extent of curl of the samples is assessed.

(b) 19 ×14 cm rectangular samples (3 replicates) of the paper are cut and cycled from 70 to 30 to 70% RH in steps of 10% RH. After conditioning for 1 at each test humidity the curl is assessed by measuring the height above the horizontal support surface of each of the corners. Results are quoted as the maximum average corner height (in mm) and the maximum change in corner height.

The method (b) gives numerically more pessimistic results. Both methods tend to overstate curl for laboratory coated sheets as these are not de-curled on-machine. In method (b) the change in corner height figure provides some compensation for this.

| Proprietary Materials used in the Examples | | |
|---|---|---|
| Trade Name or Designation | Description | Supplier |
| C23 | aqueous maize dextrin, 70% solids, Brookfield viscosity 18000 cP. | Laing-National |
| Nadex 442 | aqueous maize dextrin, 40% solids, Brookfield viscosity 10000 cP. | Laing-National |
| Gohsenol GLO 5 | Solid polyvinyl alcohol (low molecular weight) | Nippon Gohsei |
| Gohsenol GMO 14 | Solid polyvinyl alcohol (medium molecular weight) | Nippon Gohsei |
| Vinamul 8455 | 63% solids aqueous polyvinyl acetate latex | Vinyl products |
| Dinkie A | kaolin china clay (100%) | English China Clays |
| Vinamul 83007 | 63% solids aqueous polyvinyl acetate latex | Vinyl Products |
| Gohsenol GH 17 | solid polyvinyl alcohol (medium molecular weight) | Nippon Gohsei |
| EDW 90 | aqueous white farina dextrin, 70% solids, Brookfield viscosity 18000 cP. | Helias & Co. |
| Gohsenol GM 14L | solid polyvinyl alcohol (medium molecular weight) | Nippon Gohsei |
| 37-LAC-19 | 100% solid yellow dextrin | Avebe |
| Vinamul 8330 | 60% solids aqueous polyvinyl acetate latex | Vinyl Products |

EXAMPLE 1

A wood free paper of basis weight 65g m$^{-2}$ was dot coated using a laboratory screen and rubber squeegee with C23 (aqueous dextrin). The screen was of polyester monofilament fibre mesh with 130 fibres cm$^{-1}$ and an open area of 30%. The stencil overlay, produced by selective photo-curing of a suitable resin impregnated into the screen, provided an array of circular holes at 19.75 lines cm$^{-1}$ and an open area of 50%. The circles were arranged in a square array with a separation (centre to centre) of about 0.5 mm. The adhesive was coated to give a dry coatweight of 8 g m$^{-2}$. The dots in the dried coated paper had an average diameter of about 0.3 mm and an average height of 0.025 mm.

The coated paper had good adhesive properties when remoistened and adhered to an uncoated sheet of the base paper. Curl testing by method (a) showed no discernible curl over the humidity range of the test. A control circle coated with a continuous film of the same adhesive at 8 g m$^{-2}$ was tubed.

EXAMPLE 2

Example 1 was repeated with the following variations:
Adhesive: Nadex 442
Screen: mesh as in Example 1; stencil: square pattern of circular dots at 10.75 lines cm$^{-1}$ and 50% open area. The coating produced was of circular dots having an average diameter of 0.66 mm an average separation of 1.1 mm and an average height of 0.036 mm. The dry coatweight was 9 g m$^{-2}$.

The coated paper had good adhesive properties when remoistened and adhered to an uncoated sheet of the base paper. Curl testing by method (b) gave a maximum average corner height of 12 mm and a maximum change of 10 mm. A control sample coated with a continuous film of the same adhesive at 9 g m$^{-2}$ coatweight was totally tubed and became worse at lower RH.

EXAMPLE 3

Example 1 was repeated but using the screen used in Example 2. The coating produced was of a square array of circular dots having an average diameter of 0.7 mm, separation of 0.9 mm and height of 0.05 mm. The dry coatweight was 15 g m$^{-2}$.

The coated paper had good adhesive properties when remoistened and adhered to an uncoated sheet of the base paper. Curl testing by method (a) showed no signs of curl.

EXAMPLE 4

Example 1 was repeated with the following variations:
Adhesive: mix at 40% solids in water, Brookfield viscosity ca 9000 cP of (% dry basis):

| GM 14 | 15% |
|---|---|
| GL 05 | 15% |
| Vinamul 8445 | 25% |
| Dinkie A | 45% | by dispersing the GM 14 in water at ca. 10% solids adding and dispersing the GL 05, mixing in the Vinamul 8445 and then the Dinkie A to 40% solids.
Screen: mesh as in Example 1; stencil: square pattern of square dots at 19.75 lines cm$^{-1}$ and 55% open area.
The coating produces was of circular dots having an average diameter of 0.25 mm, height of 0.2 mm and separation of 0.5 mm. The coatweight was 10 g m$^{-2}$. The adhesive properties of the coated paper were good, the product gave a good time to tear (see test described below for Examples 7 to 14). Curl stability was assessed qualitatively as good (comparable to Example 7 below) but not tested numerically. The low molecular weight PVOH gave the product excellent tack properties.

EXAMPLE 5

Example 1 was repeated with the following variations:
Adhesive: A blend was prepared consisting of:
  90 parts (wet) of Vinamul 83007; and
  10 parts (wet) of Gohsenol GH 17 dissolved at 15% solids in water,
to give an adhesive blend of 49% solids in water with a Brookfield viscosity of 9600 cP at 23° C.

Screen: As in Example 2.

The coating produces was of circular dots having an average diameter of 0.66 mm, an average height of 0.035 mm and an average separation of 1.15 mm. The dry coatweight was 13 g m$^{-2}$.

The coated paper had excellent adhesive properties when remoistened and adhered to an uncoated sheet of the base paper.

Curl testing by method (b) gave a maximum average corner height of 35 mm and a maximum change of 7 mm. This example illustrates that, although the coating and drying process in this particular case gave considerable initial curl arising from the coating process, the dot coating ensured that the sheet was substantially stable to subsequent changes in relative humidity. A control sample coated with a continuous film of the same adhesive blend at 13 g m$^{-2}$ was tubed and became worse at lower RH.

EXAMPLE 6

Example 1 was repeated with the following variations:
Adhesive: EDW 90
Screen: As in Example 2.

The coating produced was of circular dots having an average diameter of 0.81 mm, an average separation of 1.14 mm and an average height of 0.042 mm. The dry coatweight was 10 g m$^{-2}$.

The coated paper had good adhesive properties when remoistened and adhered to a sheet of the base paper.

As in the previous example, the dot coated sheet exhibited curl resulting from the coating and drying processes. In order to simulate on-machine decurling, samples of the adhesive coated paper were subjected to dampening of the uncoated side. This was achieved by drawing a squeegee blade covered with a moist cloth over the paper surface. After subsequent drying the sheets were found to be virtually flat. The samples were subjected to curl testing by method (b). The sheets gave a maximum average corner height of 9 mm and a maximum change of 8 mm. A control sample coated with a continuous film of the same adhesive at 10 g m$^{-2}$ coatweight and decurled in the same manner, curled substantially and became tubed at low RH.

The following Examples 7 to 14 were all carried out at a trial using a continuous rotary screen manufactured by Stork X-cel BV of Boxmeer, Netherlands. Adhesive compositions A to E were used. The constituents, mix compositions, screens, coating conditions, product properties and test results are set out below.

| Adhesive Mix formulations A to E used in Examples 7 to 14 | | |
|---|---|---|
| Mix | Component | % dry |
| A | Gohsenol GM14L | 10 |
| | Vinamul 8330 | 30 |
| | Dinkie 'A' | 60 |
| | defoamer | trace |
| B | 37-LAC-19 | 47.5 |
| | Dinkie 'A' | 47.5 |
| | urea | 5 |
| C | 37-LAC-19 | 70 |
| | Dinkie 'A' | 30 |
| D | 37-LAC-19 | 98 |
| | sodium alginate | 2 |
| E | 37-LAC-19 | 31 |
| | Vinamul 8330 | 63 |
| | triacetin | 6 |
| | biocide | trace |
| | flavouring and sweetener | trace |
| | defoamer | trace |

TABLE 1

Properties of Adhesive Mixes A to E

| | | Viscosity | | |
|---|---|---|---|---|
| Mix | Solids % | Brookfield (cp) | Ferranti-Shirley (cP) Low Shear | High Shear |
| A | 40 | 3200 | 900 | 550 |
| B | 67 | 3500 | 1200 | 900 |
| C | 50 | 3500 | 2300 | 1800 |
| D | 53 | — | 500 | 360 |
| E | 48 | — | 3500 | 450 |

Screens P to S used in Examples 7 to 14

| Screen | Mesh (Lines inch$^{-1}$) | Open Area (%) | Aperture diameter (mym) |
|---|---|---|---|
| P | 40 | 16 | 266 |
| Q | 60 | 10 | 141 |
| R | 70 | 12 | 132 |
| S | 80 | 12 | 116 |

All these screens take the form of perforated, thin walled metal cylinders 537 mm in circumference and 0.66 m long (to match the coating width of 0.6 m). The apertures are arranged in a regular hexagonal array with the outer face of each aperture being hexagonal and slightly tapering inward (through the wall) towards a circle. 'Open areas' are based on the relative areas of these circles and the diameters given are calculated from the manufacturer's quoted mesh and open area data. 'Mesh' in lines per inch are measured along a closest centre to centre line of the aperture array. It will be recognized that the three dimensional shape of the apertures will give dots in the coating having a slightly greater diameter than that quoted for the apertures even if no further dot spread occurs.

TABLE 2

Coating Conditions.

| Ex. No. | Mix | Screen | Speed (m. min$^{-1}$) | Notes |
|---|---|---|---|---|
| 7 | A | Q | 50 | 24 mm squeegee blade |
| 8 | B | S | 50 | |
| 9 | B | S | 100 | |
| 10 | B | R | 50 | |
| 11 | C | P | 30 | |
| 12a | C | Q | 100 | Low blade pressure |
| 12b | C | Q | 75 | High blade pressure |
| 13 | D | P | 15 | * |
| 14 | E | Q | 15 | |

*In Example 13 the Dextrin on its own gave spinning problems. The inclusion of the sodium alginate improved this to some extent but the line speed was still restricted.

TABLE 3a

Description of Coated Products

| | Dot | | | Area | Ct. wt. |
|---|---|---|---|---|---|
| Ex. No. | diam. (mym) | separation (mym) | height (mym) | Covered (%) | Dry (gm$^{-2}$) |
| 7 | 254 | 169 | 14 | 33 | 7 |
| 8 | 211 | 107 | 10 | 40 | 12 |
| 9 | 215 | 103 | 18 | 42 | — |
| 10 | 252 | 111 | 20 | 44 | 15 |
| 11 | 523 | 112 | 32 | 62 | 22 |

TABLE 3a-continued

| | Description of Coated Products | | | | |
|---|---|---|---|---|---|
| | Dot | | | Area | Ct. wt. |
| Ex. No. | diam. (mym) | separation (mym) | height (mym) | Covered (%) | Dry (gm$^{-2}$) |
| 12a | 347 | 76 | 18 | 61 | 14.4 |
| 12b* | 374 | (50) | 17 | (71) | 16 |
| 13 | | | | | 17 |
| 14 | | | 20 | | 10 |

*Note:
the coating was somewhat filmed so that separate dots were not obtained. This run is for comparison.

Dot diameters and separation data were obtained from scanning electron micropgraphs. The separation figures are edge to edge measurement. The centre to centre measurement is given by the sum of the diameter and separation . Dot heights were measured as the difference in caliper (thickness) of dot coated and uncoated base paper. The figure represents an average of the peak heights of the dots. These data indicate the extent of dot spread (c.f. data on screens above).

In the trial sufficient dot screen coated paper was made in Examples 7, 8 and 11 for it to be subsequently on-machine decurled using a steam shower to apply water to the uncoated face of the paper web. Apart from the fact that the paper was reeled up on rewind of the screen coater and moved to a separate machine for decurling (because the experimental set up did not permit in-line decurling) this is equivalent to in-line on-machine decurling. With the exception of Example 12b all Examples gave much flatter and stable coated paper than would be given by paper having a continuous film of remoistenable adhesive on its. Example 12b showed signs that, although the coating showed visually separate dots, the dots had started to coalesce to form a film and that the dots were not discrete. Although they were not specifically de-curled samples from Examples 10, 12a and 14 good curl stability results summarised for Examples 7 to 14 in Table 4a below. Curl data was obtained using method (b) described above. The samples were also tested to give a guide to the remoistening characteristics with the results set out in Table 4a below. The test measures the time in seconds between remoistening of a piece of dot adhesive coated paper and application to a piece of base paper and the time when peeling the two pieces of paper apart tears one of the pieces of paper (rather than the pieces separating in the adhesive layer).

TABLE 4

| | Test Results | | |
|---|---|---|---|
| Ex. No. | Curl | Curl Stability (delta mm) | Adhesion (secs) |
| 7 | flat (d) | — | 25 |
| 8 | flat (d) | 12(d) | 30 |
| 10 | flat (d) | — | 25 |
| 11 | — | 20 | 60 |
| 12a | slight | — | 50 |
| 13 | — | — | 45 |
| 14 | — | 6 | 45 |

Entries followed by (d) indicate that the coated paper was decurled before testing.

A de-curled sample of paper from Example 7 was tested for curl stability using test method (b) against commerical particle gummed and gum broken (2 products one with a PVOH based adhesive the other with a dextrin based adhesive) products. The results are set out in Table 4b below.

TABLE 4b

| Sample | Curl Stability (delta mm) |
|---|---|
| Example 7 | 6 |
| Particle gum | 10 |
| Gum broken (PVOH based) | 20 |
| Gum broken (dextrin based) | 48 |

EXAMPLE 15

A reel of dot coated product made as described in Example 7 was on-machine decurled, as described above, and sheeted on a precision cutting machine. No runnability problems were encountered during sheeting. Conventional film coated gummed products have poor runnability on such sheeters and usually cannot be processed on them. Samples of these sheeted dot coated product and of sheets of conventional particle gum coated paper were printed, some of the 'face' i.e. non-adhesive coated, side and some on the coated side using conventional commerical sheet fed offset lithographic printing equipment. No runnability problems were observed for the dot coated product, whereas the particle gummed paper had inferior runnability showing substantial dusting of the particle gum which was picked up on the litho blanket.

The face side printed samples of the dot coated product showed no signs of print deterioration from differential pressure and were of an equal standard of printing to the face side of the particle gummed paper. The adhesive side printed samples of the dot coated product were superior to those of the particle gummed product which suffered from the effects of the dusting noted above. In fact the adhesive side of the dot coated product gave less dusting than both of the face sides in the trial. We infer from this that the dots of adhesive act to improve surface binding. The images on the dot coated product were sharper and glossier than those on the particle gummed paper. It seems that the open structure of the particle gum layer sucks the ink below the top surface of the adhesive effectively partially masking the print. These advantages were also seen when multicolour adhesive printing was trialled.

What is claimed is:

1. A method of making a paper web substrate coated uniformly over one surface therof with a discontinuous coating of a remoistenable adhesive, comprising the steps of providing a screen for a paper web substrate, the screen defining image areas in the form of discrete dots, supplying an aqueous coating mix of a remoistenable adhesive to the screen, screen coating the aqueous coating mix of the remoistenable adhesive through the screen to coat the adhesive onto a surface of the paper web substrate as discrete dots adhered to the paper web substrate, and drying the coated paper web substrate.

2. A method of making a printed label carrying a coating of a remoistenable adhesive which method comprises screen coating an aqueous coating mix of the remoistenable adhesive through a screen which provides image areas in the form of discrete dots, whereby the adhesive is coated onto a surface of a paper web substrate as discrete dots adhered to the paper web substrate, drying the coated paper web substrate, and subsequently printing the paper web substrate to provide a label.

3. The method of making a coated paper web substrates as set forth in claim 1 further including use of a screen/stencil combination to provide image areas in the form of discrete dots.

4. The method of making a coated paper web substrate as set forth in claim 1 wherein the screen coating step includes the use of a continuous rotary screen printing process.

5. The method of making a coated paper web substrate as set forth in claim 1 further including the step of decurling the paper web susbstrate.

6. The method of making a coated paper web substrate as set forth in claim 1 wherein the aqueous coating mix of remoistenable adhesive is a starch type adhesive.

7. The method of making a coated paper web substrate as set forth in claim 1 wherein the aqueous coating mix of remoistenable adhesive is selected from the group consisting of polyvinyl alcohol adhesives and synthetic remoistenable adhesives.

8. The method of making a coated paper web substrate as set forth in claim 1 wherein the aqueous coating mix of remoistenable adhesive includes a hydrophilic clay.

9. The method of making a coated paper web substrate as set forth in claim 1, wherein the screen exhibits a regular array of openings.

10. The method of making a coated paper web substrate as set forth in claim 9 wherein the screen exhibits a pattern selected from the group consisting of a square array, an offset square array, and a hexagonal array.

11. The method of making a coated paper web substrate as set forth in claim 1 wherein the discrete dots placed on the surface of the paper web substrate have an average diameter of from 0.05 to 0.3 mm.

12. The method of making a coated paper web substrate as set forth in claim 1 wherein the discrete dots placed on the surface of the paper web substrate have a shape selected from the group consisting of circles, squares, and hexagons.

13. The method of making a coated paper web substrate as set forth in claim 1 including the step of applying the aqueous coating mix of remoistenable adhesive with a coat weight of from 2 to 20 grams per square meter.

14. The method of making a coated paper web substrate as set forth in claim 1 including the step of applying the aqueous coating mix of remoistenable adhesive with a coat weight of from 4 to 18 grams per square meter.

15. The method of making a coated paper web substrate as set forth in claim 1 including the step of applying coating mix of remoistenable adhesive with a coat weight of from 8 to 15 grams per square meter.

16. The method of making a coated paper web substrate as set forth in claim 2 further including use of a screen/stencil combination to provide image areas in the form of discrete dots.

17. The method of making a printed label as set forth in claim 2 wherein the screen coating step includes the use of a continuous rotary screen printing process.

18. The method of making a printed label as set forth in claim 2 wherein the aqueous coating mix of remoistenable adhesive is a starch type adhesive.

19. The method of making a coated paper web substrate as set forth in claim 2 further including the step of decurling the paper web substrate.

20. The method of making a printed label as set forth in claim 2 wherein the aqueous coating mix of remoistenable adhesive is selected from the group consisting of polyvinyl alcohol adhesives and synthetic remoistenable adhesives.

21. The method of making a printed label as set forth in claim 2 wherein the aqueous coating mix of remoistenable adhesive includes a hydrophilic clay.

22. The method of making a printed label as set forth in claim 2 wherein the screen exhibits a generally regular array of openings.

23. The method of making a printed label as set forth in claim 22 wherein the screen exhibits a pattern selected from the group consisting of a generally square array, an offset generally square array, and a generally hexagonal array.

24. The method of making a printed label as set forth in claim 2 wherein the discrete dots placed on the surface of the paper web substrate have an average diameter of from 0.05 to 0.3 mm.

25. The method of making a printed label as set forth in claim 2 wherein the discrete dots placed on the surface of the paper web substrate have a shape selected from the group consisting of circles, squares, and hexagons.

26. The method of making a printed label as set forth in claim 2 including the step of applying the aqueous coating mix of remoistenable adhesive with a coat weight of from 2 to 20 grams per square meter.

27. The method of making a printed label as set forth in claim 2 including the step of applying the aqueous coating mix of remoistenable adhesive with a coat weight of from 4 to 18 grams per square meter.

28. The method of making a printed label as set forth in claim 2 including the step of applying the aqueous coating mix of remoistenable adhesive with a coat weight of from 8 to 15 grams per square meter.

* * * * *